US009479035B2

(12) United States Patent
Zhang et al.

(10) Patent No.: US 9,479,035 B2
(45) Date of Patent: *Oct. 25, 2016

(54) METHOD OF DYNAMIC BALANCING FOR MAGNETIC LEVITATION MOLECULAR PUMP

(71) Applicants: KYKY TECHNOLOGY CO., LTD., Beijing (CN); TSINGHUA UNIVERSITY, Beijing (CN)

(72) Inventors: Kai Zhang, Beijing (CN); Han Wu, Beijing (CN); Qizhi Li, Beijing (CN); Xiaozhang Zhang, Beijing (CN); Meng Zou, Beijing (CN)

(73) Assignees: KYKY TECHNOLOGY CO., LTD., Beijing (CN); TSINGHUA UNIVERSITY, Beijing (CN)

(*) Notice: Subject to any disclaimer, the term of this patent is extended or adjusted under 35 U.S.C. 154(b) by 237 days.

This patent is subject to a terminal disclaimer.

(21) Appl. No.: 14/362,806
(22) PCT Filed: Nov. 22, 2012
(86) PCT No.: PCT/CN2012/085077
§ 371 (c)(1),
(2) Date: Jun. 5, 2014
(87) PCT Pub. No.: WO2013/083000
PCT Pub. Date: Jun. 13, 2013

(65) Prior Publication Data
US 2014/0360006 A1    Dec. 11, 2014

(30) Foreign Application Priority Data
Dec. 5, 2011    (CN) .......................... 2011 1 0399466

(51) Int. Cl.
G01R 31/28    (2006.01)
H02K 15/16    (2006.01)
(Continued)

(52) U.S. Cl.
CPC ........... *H02K 15/165* (2013.01); *F04D 19/042* (2013.01); *F04D 29/058* (2013.01);
(Continued)

(58) Field of Classification Search
CPC .. F04D 29/058; F04D 29/662; F04D 19/042;
G01M 1/20; H02K 7/09; H02K 15/165;
F16C 32/0442; F16C 32/0444; F16C
2231/00; F16C 2360/45; Y10T 29/49004;
Y10T 29/49009; Y10T 29/49012

USPC ................. 29/593, 596, 598; 73/461, 462;
700/124, 279
See application file for complete search history.

(56) References Cited

U.S. PATENT DOCUMENTS 5,214,585 A * 5/1993 Ehrich .................... F01D 5/027
700/279

(Continued)

FOREIGN PATENT DOCUMENTS

CN    1920511 A    2/2007
CN    101046692 A    10/2007
(Continued)

OTHER PUBLICATIONS

Dekui Zhang, et al., "A method of controlling imbalance vibration of magnetic levitation bearing system," Journal of Tsinghua University (science and technology) 2000, vol. 40, No. 10 (with English language translation).

*Primary Examiner* — Donghai D Nguyen
(74) *Attorney, Agent, or Firm* — Birch, Stewart, Kolasch & Birch, LLP

(57) ABSTRACT

A method of rotor dynamic balancing for magnetic levitation molecular pump, including the steps of: activating an force free control module after activating a motor of the magnetic levitation molecular pump; if the maximum radial vibration amplitude does not exceed ½ of a protective clearance during the acceleration of the rotor under the control of the force free control module, indicating that the force free control module is able to inhibit the co-frequency vibration of the rotor, so as to allow the rotational speed of said rotor to exceed its rigid critical rotational speed; performing rotor dynamic balancing operation at a high speed by an influence coefficient method. The method of rotor dynamic balancing can directly perform rotor dynamic balancing operation with respect to the rotor at a high-speed, which facilitates the rotor dynamic balancing operation so as to perform the rotor dynamic balancing operation more quickly and efficiently.

9 Claims, 4 Drawing Sheets

(51) Int. Cl.
*F04D 29/058* (2006.01)
*F04D 29/66* (2006.01)
*F04D 19/04* (2006.01)
*G01M 1/20* (2006.01)
*H02K 7/09* (2006.01)
*F16C 32/04* (2006.01)

(52) U.S. Cl.
CPC ......... *F04D29/662* (2013.01); *F16C 32/0442* (2013.01); *G01M 1/20* (2013.01); *H02K 7/09* (2013.01); *F16C 32/0444* (2013.01); *F16C 2231/00* (2013.01); *F16C 2360/45* (2013.01); *Y10T 29/49004* (2015.01)

(56) References Cited

U.S. PATENT DOCUMENTS 5,412,583 A * 5/1995 Cameron ................ G01M 1/22
 700/279
5,724,271 A * 3/1998 Bankert ................ F16F 15/32
 701/124
6,498,410 B1 12/2002 Yashiro et al.
2010/0054957 A1 3/2010 Goetze et al.
2014/0314570 A1* 10/2014 Zhang ................ F04D 29/058
 416/1

FOREIGN PATENT DOCUMENTS

| | | |
|---|---|---|
| CN | 101187589 A | 5/2008 |
| CN | 101261496 A | 9/2008 |
| CN | 101495760 A | 7/2009 |
| CN | 102032208 A | 4/2011 |
| CN | 102425561 A | 4/2012 |
| CN | 102425562 A | 4/2012 |
| EP | 1 650 441 A2 | 4/2006 |
| JP | 08-200367 A | 8/1996 |

\* cited by examiner

METHOD OF DYNAMIC BALANCING FOR MAGNETIC LEVITATION MOLECULAR PUMP

FIELD OF THE INVENTION

The present invention relates to a vacuum production device, in particular, a method of rotor dynamic balancing for magnetic levitation molecular pump.

BACKGROUND OF THE INVENTION

A molecular pump is a type of vacuum pump, which takes advantage of a high rotating wheel of a rotor for delivering momentum to gas molecules so as to provide them with desired direction speed, thus the gas shall be inhibited and driven towards the exhaust, and then be pumped by a forestage pump. A magnetic levitation molecular pump is a molecular pump that takes a magnetic bearing (also known as active magnetic levitation bearing) as a bearing for the rotor of the molecular pump, and the rotor is suspended in the air stably through the magnetic bearing, so that no mechanical contact exists between the rotor and the stator during the rotation of the rotor with high speed. Thus, the magnetic levitation molecular pump has several advantages such as no mechanical attrition, low energy consumption, allowed rotating with high speed, low noise, long life-time, no requirement of lubrication, etc. Currently, the magnetic levitation molecular pumps are widely applied to field of vacuum production devices for obtaining high vacuum and high cleanliness vacuum environment.

The inner structure of the magnetic levitation molecular pump is shown in FIG. 1. The rotor of magnetic levitation molecular pump comprises a rotor shaft 7 and a wheel 1 in fixed connection with the rotor shaft 7. The wheel 1 is fixed on the upper portion of the rotor shaft 7; the rotor shaft 7 is successively covered with a first radial magnetic bearing 6, a motor 8, and a second radial magnetic bearing 9 etc. in a separated manner. The above listed assemblies together constitute the rotor shaft system of the magnetic levitation molecular pump.

After completing assemble of the magnetic levitation molecular pump, imbalance mass may exist in the rotor because of several problems such as differences between processing accuracy of every part of the rotor. Imbalance mass means mass in a certain distance from the barycenter of the rotor, and the product of this mass and centripetal acceleration equals to the rotor's imbalance centrifugal force. When the imbalance mass is much larger than 10 mg, due to this imbalance mass, an eccentric moment may be generated between the barycenter of the rotor and its axis. Therefore, during the rotating ascend of the rotor, the centrifugal force caused by the imbalance mass of the rotor may cause transverse mechanical vibration of the rotor (usually radial vibration), and further to impact normal work of the system. In addition, normal working speed of the rotor of the magnetic levitation molecular pump is remaining within a high speed range that is beyond the rigid critical speed of the rotor, and the imbalance mass may also block the rotor from rotating with an increasing speed till normal working speed, i.e. the magnetic levitation molecular pump cannot work normally. Here, the rigid critical speed of the rotor indicates a rotating speed that is in correspondence to a speed when the rotating frequency of the rotor equals to the rigid resonance frequency of the rotor bearing system; while the high speed range which higher than rigid critical speed may be known as super rigid critical rotating speed range.

A method for inhibiting imbalance vibration generated during the acceleration and deceleration of the rotating member rotating with high speed such as the rotor of the magnetic vibration molecular pump, and the method is called "method of controlling imbalance vibration". Chinese Periodical Literature "a method of controlling imbalance vibration of magnetic levitation bearing system" (Dekui, ZHANG, Wei, JIANG, Hongbin, ZHAO, Journal of Tsinghua University (science and technology) 2000, Volume 40, No. 10) discloses two methods of controlling imbalance vibration. One is force free control, the principle of which is to generate a compensation signal having a same phase and same amplitude with a displacement/vibration signal of the rotor, in order to counteract same frequency of vibration of the rotor. The other method is open loop feed forward control, the principle of which is extracting a same frequency component of a vibration signal of the rotor, and then generating a corresponding controlling signal by an extra feed forward control, which may be added into a controlling signal of a main controller.

Chinese patent literature CN101261496A discloses a high-precision control system for active vibration of magnetic levitation wheel, comprising a displacement sensor, a current sensor, a controller for magnetic bearing and an power amplifier for magnetic bearing, wherein, the controller for magnetic bearing comprises a stability controller, an eccentric estimation unit, a magnetic force compensation unit and a switch. Based on stability control, the patent also introduces the eccentric estimation unit and the magnetic force compensation unit as well as taking advantage of wheel imbalance vibration parameter so as to make compensation to imbalance values and negative displacement rigidity within allowed rotating speed of the wheel. Therefore, imbalance vibration within allowed rotating speed of the wheel is controlled, furthermore, the wheel can rotate around the inertia axis with high-precision during the entire acceleration and deceleration of the wheel. Additionally, Chinese patent literature CN 101046692A discloses an open loop high-precision control system for imbalance vibration of magnetic bearing reaction wheel, comprising a displacement sensor, an interface circuit for displacement signal, a detector for rotating speed, a controller for magnetic bearing, a power amplifier circuit for magnetic bearing and a detector for position of the wheel. The controller for magnetic bearing comprises an axial controller and a radial controller, wherein, the axial controller comprises a controller for stability and a controller for imbalance vibration that is adapted for providing compensation to displacement feedback of the controller for stability. Based on stability controlling, imbalance vibration controlling is incorporated. By using imbalance vibration parameter of the wheel detected during the high-speed rotation of the wheel, as well as using current position of the rotor of the wheel detected by the detector for position of the wheel, imbalance vibration is controlled in an open loop high-precision manner within the allowed rotating speed of the wheel, thus imbalance vibration controlling is achieved within the entire allowed rotating speed of the wheel, which ensures the wheel to rotate with a high-precision during its acceleration and deceleration.

The two aforesaid patent literatures disclose specific applications of "method for rotor imbalance vibration control". However, due to limited ability of imbalance vibration control by using "method for rotor imbalance vibration control", which means it is required the imbalance mass of the rotating member staying within a certain threshold. Therefore, the method for imbalance vibration control cannot completely solve the problem of the rotor vibration caused by rotor's imbalance mass. When there is a large imbalance mass in the rotor, the "method for rotor imbalance vibration control" cannot be used any more to suppress vibration of the rotor and to accelerate the rotor directly beyond the rigid critical rotating speed till its normal working rotating speed.

Thus, after assembling the magnetic levitation molecular pump, rotor dynamic balancing operation is required to be executed. Here "rotor dynamic balancing operation" means an operation for adjusting and eliminating imbalance mass through measuring weight and phase of the imbalance mass of the rotor, so that no centrifugal force shall be generated during the rotation of the rotor.

Generally, a rotor dynamic balancing device is used for executing rotor dynamic balancing operation, with steps of:
Firstly, rotating the rotor at a low speed (slower than rigid critical rotating speed of the rotor), and operating rotor dynamic balancing through the rotor dynamic balancing device;
Then, adding or removing weight to the rotor in a purpose of balance so as to eliminate its imbalance mass preliminarily;
Then, repeating the above listed steps till the rotating speed of the rotor being accelerated beyond rigid critical rotating speed;
When the rotating speed of the rotor is accelerated into the range of super rigid critical rotating speed, operating rotor dynamic balancing again through the rotor dynamic balancing device at a high speed, and then adding or removing weight to the rotor thereafter. In order to eliminate imbalance mass accurately, the aforesaid steps are required to be repeated for several times.

When the rotor of magnetic levitation molecular pump is rotating at a speed in the range of super rigid critical rotating speed, we focus on the performance of the rotor at high rotating speed, thus the effect of operating rotor dynamic balancing when the rotor is rotating at low speed is not obvious. Only when the rotating speed of the rotor is much more faster than the rigid critical rotating speed (entering the range of super rigid critical rotating speed), the rotor may rotate around its barycenter approximately. At this moment, operating rotor dynamic balancing may get more accurate and better effects. However, due to the existed imbalance mass, the rotor cannot be accelerated directly into the range of super rigid critical rotating speed, furthermore cannot be operated with rotor dynamic balancing operation at a high speed. Therefore, it is required to operate the rotor with rotor dynamic balancing operation when the rotor is rotating at a low speed and then accelerate it till the range of super rigid critical rotating speed, and operate it with rotor dynamic balancing operation again at high speed. This method of dynamic balancing of the rotor is quite inconvenient and inefficient. Also, the rotor dynamic balancing device used for operating dynamic balancing is commercially available, and people purchase this device in addition for dynamic balancing operation to the rotor, which may increase the cost of their products.

SUMMARY OF THE INVENTION

In view of the forgoing, the present invention aims at solving at least one technical problem that the method of rotor dynamic balancing for the magnetic levitation molecular pump of prior art is inconvenient and inefficient, thus providing a method of directly dynamic balancing for a magnetic levitation molecular pump rotor at high speed, which is convenient and efficient as well as no requirements for a rotor dynamic balancing device and low cost.

To solve the above technical problem, the present invention provides a method of rotor dynamic balancing for magnetic levitation molecular pump.

Advantages of this invention are summarized below:
1. The method of rotor dynamic balancing for the magnetic levitation molecular pump of the present invention, activating an force free control module of a controller of the magnetic levitation molecular pump after activating a motor of the magnetic levitation molecular pump. By means of the force free control algorithm, co-frequency compositions of the displacement signals can be eliminated, and the co-frequency vibrations of the rotor can be inhibited, so that the rotor can rotate around its geometric center, furthermore, because the force free control module may ensure small excitation current outputted by the coil, the requirements of power amplifier are relatively low. If the maximum radial vibration amplitude caused by the imbalance mass of the rotor does not exceed ½ of a protective clearance during the acceleration of the rotor under the control of the force free control module (i.e. the imbalance mass of the rotor is below a preset threshold), indicating that the force free control module is able to inhibit the co-frequency vibration of the rotor so as to allow the rotational speed of the rotor to exceed the rigid critical rotational speed thereof after a short time period, then directly performing rotor dynamic balancing operation with respect to the rotor of the magnetic levitation molecular pump at a high-speed. It facilitates the rotor dynamic balancing operation so as to perform the rotor dynamic balancing operation more quickly and efficiently, which greatly improves the efficiency of rotor dynamic balancing and the effect of balancing. Additionally, to utilize the method of rotor dynamic balancing for magnetic levitation molecular pump of the present invention, no rotor additional dynamic balancing device is required, but by means of the first radial displacement sensor and the second radial displacement sensor thereof to perform measurements, which simplifies the structure of equipment, reduces the cost, and improves the use value of the product.

2. By means of the method of rotor dynamic balancing for magnetic levitation molecular pump of the present invention, it allows the rotor dynamic balancing module arranged inside the controller to calculate the required balance mass and its loaded phase may be preformed of the rotor instead of the rotor dynamic balancing device, so as to reduce the cost.

3. It is advantageous for the method of rotor dynamic balancing for magnetic levitation molecular pump of the present invention to comprise two balance planes disposed on an upper portion and a lower portion of the rotor respectively, which are respectively far away from the barycenter of the rotor and close to two ends of the rotor, thus greater force moments may be generated during adding of the compensation vectors, so as to improve efficiency of balancing.

4. It is advantageous for the method of rotor dynamic balancing for magnetic levitation molecular pump of the present invention that the vibration threshold with respect to the nonrated rotational speed is 40 μm, which meets the requirement of the radial vibration amplitude of the rotor at the nonrated rotational speed and allows the rotor to accelerate stably to the rated rotational speed. And the vibration threshold with respect to the rated rotational speed is 0.1 μm, and the preset imbalance mass is 10 mg, which allows the rotor to rotate stably at the rated rotational speed, so as to ensure a stable operation of the magnetic levitation molecular pump.

DESCRIPTION OF THE DRAWINGS

Detailed description will be given below in conjunction with accompanying drawings.

Figure 1:
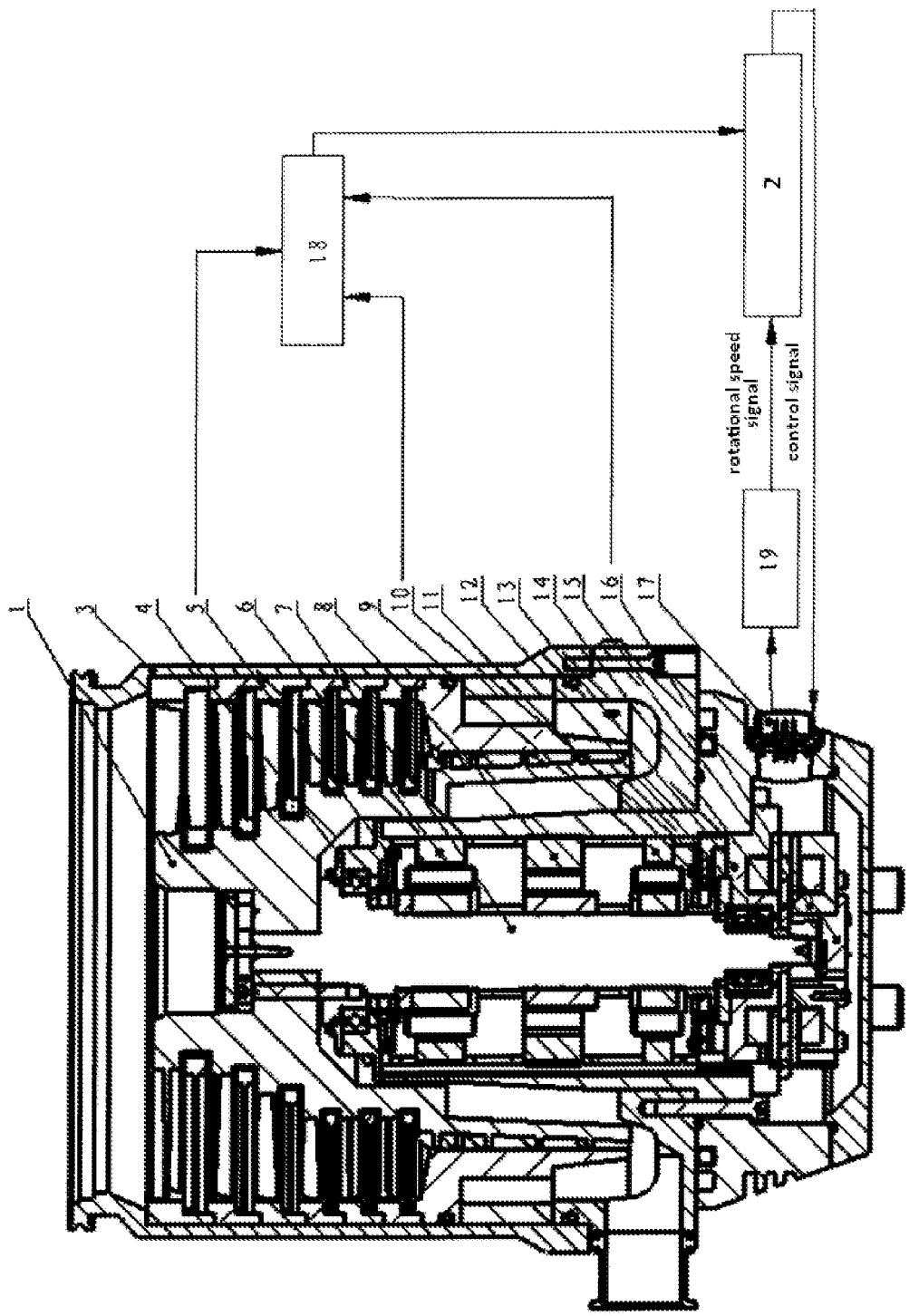
FIG. 1 shows a structure of a magnetic levitation molecular pump of the present invention.

In the drawings, the following reference numbers are used:
1—flywheel, 2—controller of a magnetic levitation molecular pump, 3—pump body, 4—first radial protective bearing, 5—first radial displacement sensor, 6—first radial magnetic bearing, 7—rotor shaft, 8—motor, 9—second radial magnetic bearing, 10—second radial displacement sensor, 11—second radial protective bearing, 12—axial protective bearing, 13—first axial magnetic bearing, 14—thrust plane, 15—second axial magnetic bearing, 16—axial displacement sensor, 17—connector, 18—displacement detector, 19—rotational speed detector.

DETAILED DESCRIPTION OF THE EMBODIMENTS

FIG. 1 shows a structure of the magnetic levitation molecular pump of the present invention. The magnetic levitation molecular pump of the present embodiment is arranged vertically, which comprises a pump body 3, a rotor shaft system disposed in the pump body 3, and other components necessary for the magnetic levitation molecular pump of prior art.

The rotor shaft system comprises a rotor, a first radial magnetic bearing 6, a second radial magnetic bearing 9, a first axial magnetic bearing 13 and a second axial magnetic bearing 15; the rotor comprises a rotor shaft 7, a flywheel 1 fixed to the rotor shaft 7, and a plurality of assembling members adapted for fixing the flywheel 1, such as bolts, nuts etc.

The axis of the rotor shaft 7 is arranged in the vertical direction, and the flywheel 1 is disposed on the upper portion of the rotor shaft 7 in a fixing manner. The first axial magnetic bearing 13, the second axial magnetic bearing 15, a thrust plane 14, an axial protective bearing 12 and an axial displacement sensor 16 for detecting axial displacement signals of the rotor are disposed on the lower portion of the rotor shaft 7. The rotor shaft 7 is successively covered with a first radial protective bearing 4, a first radial displacement sensor 5, the first radial magnetic bearing 6, a motor 8, the second radial magnetic bearing 9, a second radial displacement sensor 10 and a second protective bearing 11 and the like. The first radial protective bearing 4 is disposed coaxial with the second radial protective bearing 11 and with the same radial dimension. The first radial magnetic bearing 6 comprises a stator and a rotor; the stator of the first radial magnetic bearing is fixed to the pump body; the rotor of the first radial magnetic bearing is fixed to the rotor shaft 7; the first radial displacement sensor 5 is adapted for detecting radial displacement signals of the rotor with respect to the first radial displacement sensor 5. The second radial magnetic bearing 9 comprises a stator and a rotor; the stator of the second radial magnetic bearing is fixed to the pump body 3 and the rotor of the second radial magnetic bearing is fixed to the rotor shaft 7; the second radial displacement sensor 10 is adapted for detecting radial displacement signals of the rotor with respect to the second radial displacement sensor 10. The rotor shaft 7 is supported by the first radial magnetic bearing 6, the second radial magnetic bearing 9, the first axial magnetic bearing 13 and the second axial magnetic bearing 15.

The control system of the magnetic levitation molecular pump comprises a displacement detector 18, a rotational speed detector 19 and a controller of the magnetic levitation molecular pump 2; the displacement detector 18 is adapted for receiving displacement signals, and the signal input thereof is in communication with the first radial displacement sensor 5, the second radial sensor 10 and the signal output of the axial displacement sensor 16; and the signal output of the displacement detector 18 is in communication with the signal input of the controller of the magnetic levitation molecular pump 2; the rotational speed detector 19 is adapted for detecting the rotational speed of the rotor; and the signal input thereof is in communication with a rotational speed detecting sensor through a connector 17 of the magnetic levitation molecular pump; the signal output of the rotational speed detector 19 is in communication with the signal input of the controller of the magnetic levitation molecular pump.

Various control algorithms modules are built inside the controller of the magnetic levitation molecular pump 2, so as to call a suitable control algorithm for calculation through the controller of the magnetic levitation molecular pump 2 according to the displacement signal obtained by the displacement detector 18 and finally to drive the corresponding magnetic bearing(s) (one or more than one of the first radial magnetic bearing 6, the second radial magnetic bearing 9, the first axial magnetic bearing 13 and the second axial magnetic bearing 15) to output electric magnetic forces for controlling the rotor suspension. In addition, the controller of the magnetic levitation molecular pump 2 can monitor the rotation of the rotor in real time, according to the rotational speed signal obtained by the rotational speed detector 19 and adjust the rotational speed of the rotor based on system requirements.

Figure 2:
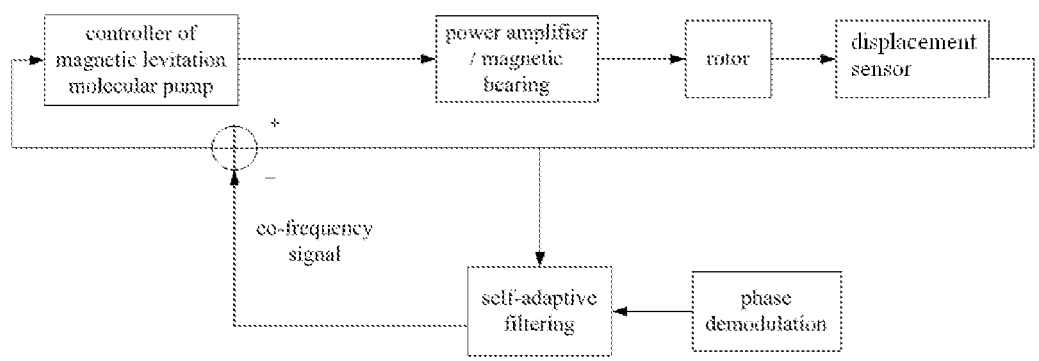
FIG. 2 shows the principle of the control algorithm of force free control module of the present invention.

Furthermore, a force free control module and a rotor dynamic balancing module are disposed in the controller of the magnetic levitation molecular pump 2. In the present embodiment, by means of a force free control module, a control force having an inverted phase with respect to the co-frequency vibration of the rotor, is generated through the force free control module, so as to inhibit the co-frequency vibrations of the rotor. By means of the force free control module, co-frequency compositions of the displacement signals can be eliminated, and the co-frequency vibrations of the rotor can be inhibited, so that the rotor can rotate around its geometric center, shown in FIG. 2. This method ensures small excitation current outputted by the coil, which is suitable for the situation that requirements of power amplifiers are relatively low. The rotor dynamic balancing module is adapted for calculating a required balance mass and the loaded phase thereof of the rotor. In the present embodiment, an influence coefficient method for balancing a rigid rotor is applied to the rotor dynamic balancing module so as to obtain the imbalance mass of the rotor.

Figure 3:
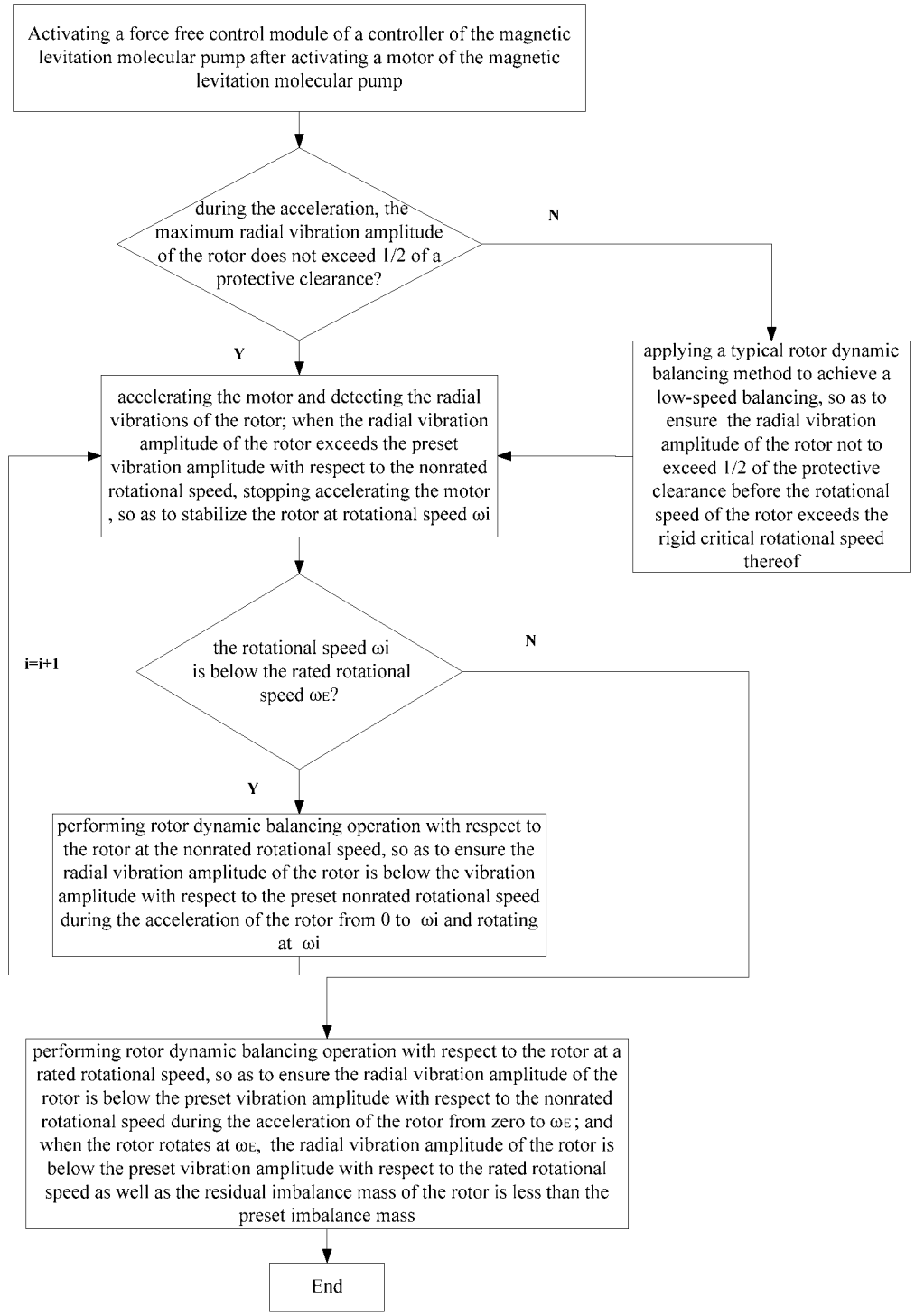
FIG. 3 is a flow chart of the method of rotor dynamic balancing of the present invention.
Figure 4:
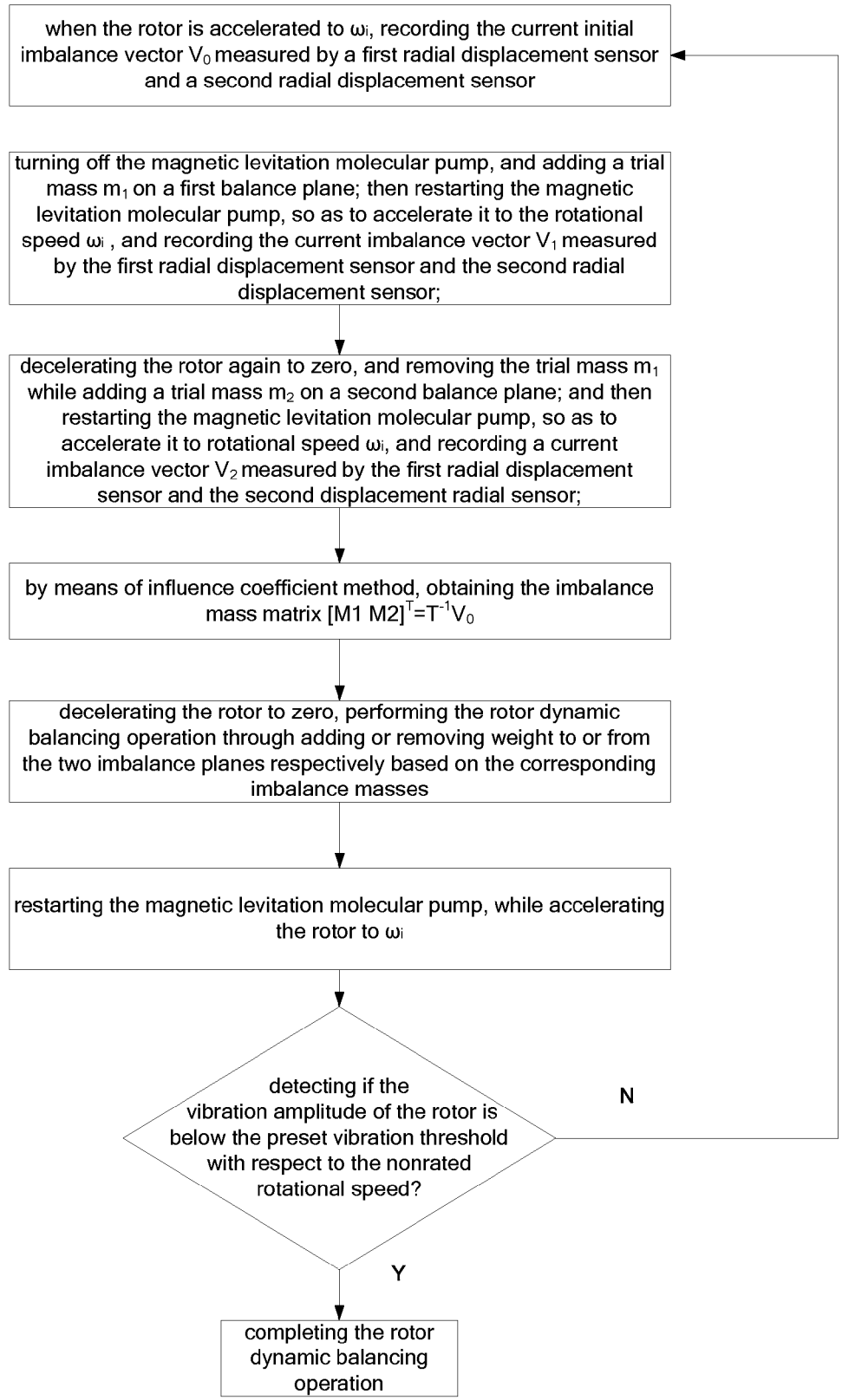
FIG. 4 is a flow chart of the method of rotor dynamic balancing by means of influence coefficient method of the present invention.

After assembling the magnetic levitation molecular pump, it is required to perform rotor dynamic balancing operation with respect to the magnetic levitation molecular pump for eliminating the imbalance mass of the rotor. In the present embodiment, the rigid critical rotational speed and the rated rotational speed $\omega_E$ of the rotor are known. Referring to FIG. 3, the method for dynamic balancing comprises steps of:

step 1: activating an force free control module of the controller of the magnetic levitation molecular pump (2) after activating the motor (8) of the magnetic levitation molecular pump for acceleration;

controlling a displacement detector (18) through the controller of the magnetic levitation molecular pump (2) so as to collect radial displacement signals of the rotor of the magnetic levitation molecular pump and to detect radial vibration amplitude of the rotor; and sequentially executing step 2, if the maximum radial vibration amplitude does not exceed ½ of a protective clearance during the acceleration of the rotor under the control of the force free control module, indicating that the force free control module is able to inhibit the co-frequency vibration of the rotor, so as to allow the rotational speed of the rotor to exceed its rigid critical rotational speed; or applying a typical rotor dynamic balancing method to achieve a low-speed balancing, so as to ensure the radial vibration amplitude of the rotor not to exceed ½ of the protective clearance before the rotational speed of the rotor exceeds the rigid critical rotational speed thereof, if the maximum radial vibration amplitude of the rotor exceeds ½ of the protective clearance, and then sequentially executing step 2, after the rotational speed of the rotor exceeds the rigid critical rotational speed thereof;

step 2: detecting the radial vibration amplitude of the rotor through the displacement detector (18) during the further acceleration of the motor (8); and stopping accelerating the motor (8), so as to stabilize the rotor at rotational speed $\omega_i$ (i=0, 1, 2) . . . ), when the radial vibration amplitude of the rotor exceeds a preset vibration threshold of the rotor with respect to the nonrated rotational speed;

detecting the current rotational speed $\omega_i$ through a rotational speed detector (19) controlled by the controller of the magnetic levitation molecular pump (2); and determining if the rotational speed $\omega_i$ is below the rated rotational speed of the rotor $\omega_E$; if $\omega_i$; is below $\omega_E$, then sequentially executing step 3, otherwise jumping to step 5;

step 3: performing rotor dynamic balancing operation with respect to the rotor at the nonrated rotational speed, by means of influence coefficient method, under the control of the force free control module, with the rotor dynamic balancing operation for the rotor at $\omega_i$ comprising steps of (referring to FIG. 4):

3a) calling a rotor dynamic balancing module through the controller of the magnetic levitation molecular pump (2) according to the current radial vibration amplitude and the rotational speed of the rotor, after the rotor with two balance planes preset thereon is accelerated to $\omega_i$, and recording the current initial imbalance vector $V_0$ measured by a first radial displacement sensor and a second radial displacement sensor, wherein, the two balance planes are preset respectively away from the barycenter of the rotor, but located close to both ends of the rotor;

3b) turning off the motor of the magnetic levitation molecular pump, so as to decelerate the rotor to zero, and adding a trial mass $m_1$ on a first balance plane; then restarting the magnetic levitation molecular pump, so as to accelerate to the rotational speed $\omega_i$, and recording the current imbalance vector $V_1$ measured by the first radial displacement sensor and the second radial displacement sensor;

3c) decelerating the rotor again to zero, and removing the trial mass $m_1$ while adding a trial mass $m_2$ on a second balance plane; and then restarting the magnetic levitation molecular pump, so as to accelerate it to rotational speed $\omega_i$; according to the aforesaid steps, and recording a current imbalance vector $V_2$ measured by the first radial displacement sensor and the second radial displacement sensor;

3d) with $M_1$ and $M_2$ in correspondence to the initial imbalance masses of the two imbalance planes respectively. calculating influence coefficient matrix T by means of influence coefficient method, which is:

$V_0=T[M_1M_2]^T$ $V_1=T[M_1+m_1M_2]^T$ $V_2=T[M_1M_2+m_2]^T$ obtaining the influence coefficient matrix T according to the aforesaid matrix equations, and obtaining the initial imbalance mass matrix $[M1\ M2]T=T^{-1}\ V_0$ through substitution in the first matrix equation;

3e) decelerating the rotor to zero, performing the rotor dynamic balancing operation through adding or removing weight to or from the two imbalance planes respectively based on the initial imbalance masses measured by means of step 3d);

3f) restarting the magnetic levitation molecular pump, while accelerating the rotor to $\omega_i$, and detecting the radial vibration amplitude of the rotor, if the detected radial vibration amplitude is below the preset vibration threshold regarding the nonrated rotational speed, completing the rotor dynamic balancing operation at the current rotational speed and jumping to the next step; otherwise, repeating with step 3a) to 3f) till the detected radial vibration amplitude of the rotor is below the preset vibration threshold with respect to the nonrated rotational speed when the rotor rotates at speed $\omega_i$, and sequentially executing step 4;

step 4: letting i=i+1, and repeating step 2;

step 5: under the control of the force free control module, performing rotor dynamic balancing operation with respect to the rotor at a rated rotational speed; the radial vibration amplitude of the rotor is below the preset vibration threshold regarding the nonrated rotational speed during the acceleration of the rotor from zero to $\omega_E$; and when the rotational speed of the rotor reaches $\omega_E$, the radial vibration amplitude of the rotor is below the preset vibration threshold with respect to the rated rotational speed as well as the residual imbalance mass of the rotor is less than the preset imbalance mass, completing the rotor dynamic balancing operation. The range of the vibration threshold with respect to the rated rotational speed is [0.05 μm, 0.1 μm]; and the range of the preset imbalance mass is [5 mg, 12 mg]. In the present embodiment, the vibration threshold with respect to the rated rotational speed is 0.1 μm, and the preset imbalance mass is 10 mg. More specifically, the method comprises steps of:

A. if $\omega_i>\omega_E$, activating the motor (8) for decelerating the rotor speed to $\omega_E$' otherwise keeping the rotor rotating at $\omega_E$;

B. calling the rotor dynamic balancing module by the controller of the magnetic levitation molecular pump (2) based on the current radial vibration amplitude and the rotational speed of the rotor, and performing rotor dynamic balancing operation with respect to the rotor by means of influence coefficient method; performing rotor dynamic balancing operation with respect to the rotor rotating at $\omega_E$ according to step (3a) to (3e), so as to obtain a required balance mass and its loaded phase of the rotor; turning off the motor (8) for decelerating the rotor to zero and sequentially executing step C;

C. performing rotor dynamic balancing operation with respect to the rotor according to the calculated required balance mass and its loaded phase and sequentially executing step D;

D. activating the motor (8), and activating the force free control module, and detecting radial vibration amplitude of the rotor by the displacement detector (18); and sequentially executing step E, if under the control of the force free control module, the maximum radial vibration amplitude of the rotor caused by imbalance masses of the rotor does not exceed ½ of the protective clearance during the acceleration of the rotor, indicating that the force free control module is able to inhibit the synchronous vibrations of the rotor and the rotor can be accelerated beyond its rigid critical rotational speed;

E: detecting radial vibration amplitude of the rotor during the acceleration of the rotor to $\omega_E$ during the further acceleration of the motor (8), and sequentially executing step F, if the radial vibration amplitude of the rotor is lower than the preset vibration threshold regarding the nonrated rotational speed, then; or turning off the motor (8) from accelerating, and repeating the step B, if the detected radial vibration amplitude of the rotor is over or equivalent to the preset vibration threshold regarding the nonrated rotational speed;

F: activating the motor (8) for further accelerating the rotor to $\omega_E$; turning off the motor (8) from acceleration, and keeping the rotor rotating at $\omega_E$, and then sequentially executing step G;

G. detecting the current radial vibration amplitude of the rotor, a. if the radial vibration amplitude of the rotor is lower than the preset vibration threshold regarding the rated rotational speed, calling the rotor dynamic balancing module via the controller of the magnetic levitation molecular pump (2) according to the current radial vibration amplitude and the phase of the rotor; performing rotor dynamic balancing operation with respect to the rotor by means of influence coefficient method, so as to obtain the required balance mass and its loaded phase of the rotor, and turning off the motor (8) for decelerating the rotor to zero:

i. if the residual imbalance mass of the rotor is smaller than the preset imbalance mass, completing the rotor dynamic balancing operation;

ii. otherwise sequentially executing step C;

b. if the radial vibration amplitude of the rotor is above or equivalent to the preset vibration threshold with respect to the rated rotational speed, then repeating step B.

In an alternative embodiment, before the step 1, the method for rotor dynamic balancing further comprises steps of dynamical simulation calculating for the magnetic levitation molecular pump and obtaining the rigid critical rotational speed of the rotor and the rated rotational speed $\omega_E$, by means of known method for calculating and testing of prior art.

In an alternative embodiment, given to various circumstances, the vibration threshold with respect to the nonrated rotational speed may be 20 µm, 25 µm, 30 µm or 35 µm etc., and the vibration threshold with respect to the rated rotational speed may be 0.05 µm, 0.07 µm or 0.09 µm etc., and the preset imbalance mass may be 5 mg, 8 mg or 12 mg etc., which can also achieve the objectives of the present invention.

Although the present invention has been described with particular reference to certain preferred embodiments thereof, variations and modifications of the present invention can be effected within the spirit and scope of the claims.

The invention claimed is:

1. A method of rotor dynamic balancing for magnetic levitation molecular pump, wherein comprising steps of:

step 1: activating a force free control module of a controller of said magnetic levitation molecular pump after activating a motor of said magnetic levitation molecular pump for acceleration;

controlling a displacement detector through said controller of said magnetic levitation molecular pump so as to collect radial displacement signals of a rotor of said magnetic levitation molecular pump and to detect radial vibration amplitude of said rotor; and sequentially executing step 2, if the maximum radial vibration amplitude does not exceed ½ of a protective clearance during the acceleration of said rotor under the force free control module control, indicating that the force free control module is able to inhibit co-frequency vibration of said rotor, so as to allow a rotational speed of said rotor to exceed a rigid critical rotational speed of the motor; or applying a typical rotor dynamic balancing method to achieve a low-speed balancing, so as to ensure the radial vibration amplitude of said rotor not to exceed ½ of said protective clearance before the rotational speed of said rotor exceeds the rigid critical rotational speed thereof, if the maximum radial vibration amplitude of said rotor exceeds ½ of said protective clearance, and then sequentially executing step 2, after the rotational speed of said rotor exceeds the rigid critical rotational speed thereof;

step 2: detecting the radial vibration amplitude of said rotor through said displacement detector during the further acceleration of said motor; and stopping accelerating said motor, so as to stabilize said rotor at rotational speed $\omega_i$ wherein, i represents whole numbers 0, 1, 2, 3, . . . , when the radial vibration amplitude of said rotor exceeds a preset vibration threshold of said rotor with respect to nonrated rotational speed detecting a current rotational speed $\omega_i$ through a rotational speed detector controlled by said controller of said magnetic levitation molecular pump; and determining if the rotational speed $\omega_i$ is below a rated rotational speed of said rotor $\omega_E$; if $\omega_i$ is below $\omega_E$, then sequentially executing step 3, otherwise jumping to step 5;

step 3: performing rotor dynamic balancing operation with respect to said rotor at the nonrated rotational speed, by means of influence coefficient method, under the force free control module, with the operation of rotor dynamic balancing for said rotor at $\omega_i$ comprising steps of:

3*a*) calling a rotor dynamic balancing module through said controller of said magnetic levitation molecular pump according to a current radial vibration amplitude and the rotational speed of said rotor, after said rotor with two balance planes preset thereon is accelerated to ωi, and recording a current initial imbalance vector V0 measured by a first radial displacement sensor and a second radial displacement sensor; wherein, the two balance planes are preset respectively away from the barycenter of the rotor, but located close to both ends of the rotor;

3*b*) turning off said motor of said magnetic levitation molecular pump, so as to decelerate said rotor to zero, and adding a trial mass $m_1$ on a first balance plane; then restarting said magnetic levitation molecular pump so as to accelerate to the rotational speed $\omega_i$, and recording the current imbalance vector $V_1$ measured by said first radial displacement sensor and said second radial displacement sensor;

3c) decelerating said rotor again to zero, and removing said trial mass $m_1$ while adding a trial mass $m_2$ on a second balance plane; and then restarting said magnetic levitation molecular pump so as to accelerate the magnetic levitation molecular pump to rotational speed $\omega_i$ according to the aforesaid steps, and recording a current imbalance vector $V_2$ measured by said first radial displacement sensor and said second radial displacement sensor;

3d) with $M_1$ and $M_2$ being initial imbalance masses of two imbalance planes respectively, calculating influence coefficient matrix T by means of influence coefficient method, which is:

$$V_0 = T[M_1 M_2]^T$$

$$V_1 = T[M_1 + m_1 M_2]^T$$

$$V_2 = T[M_1 M_2 + m_2]^T$$

obtaining the influence coefficient matrix T according to the aforesaid matrix equations, and obtaining the initial imbalance mass matrix $[M1\ M2]^T = T^{-1} V_0$ through substitution in the first matrix equation;

3e) decelerating said rotor to zero, performing the rotor dynamic balancing operation through adding or removing weight to or from said two imbalance planes respectively based on the initial imbalance masses measured by means of step 3d);

3f) restarting said magnetic levitation molecular pump, while accelerating said rotor to $\omega_i$, and detecting a vibration amplitude of said rotor to determine if the vibration amplitude is below the preset vibration threshold with respect to the nonrated rotational speed; if the detected radial vibration amplitude is below said preset vibration threshold regarding the nonrated rotational speed, completing the rotor dynamic balancing operation at the current rotational speed and jumping to the next step; otherwise, repeating with step 3a) to 3f) till said rotor rotating at speed $\omega_i$, and the detected radial vibration amplitude of said rotor is below the preset vibration threshold with respect to the nonrated rotational speed when the rotor rotates at speed $\omega_i$, and sequentially executing step 4;

step 4: letting i=i+1, and repeating step 2;

step 5: under the force free control module control, performing rotor dynamic balancing operation with respect to said rotor at a rated rotational speed; the radial vibration amplitude of said rotor is below the preset vibration threshold regarding the nonrated rotational speed during the acceleration of said rotor from zero to $\omega_E$; and when the rotational speed of said rotor reaches $\omega_E$, the radial vibration amplitude of said rotor is below the preset vibration threshold with respect to the rated rotational speed as well as the residual imbalance mass of said rotor is less than the preset imbalance mass, completing the rotor dynamic balancing operation.

2. The method of rotor dynamic balancing of claim 1, wherein said step 5 further comprises steps of:

A. if $\omega_i > \omega_E$, activating said motor for decelerating said rotor speed to $\omega_E$, otherwise keeping said rotor rotating at $\omega_E$;

B. calling said rotor dynamic balancing module by said controller of said magnetic levitation molecular pump based on the current radial vibration amplitude and the rotational speed of said rotor, and performing rotor dynamic balancing operation with respect to said rotor by means of influence coefficient method; performing rotor dynamic balancing operation with respect to said rotor rotating at $\omega_E$ according to step 3a) to 3e), so as to obtain a required balance mass and a loaded phase of balance mass of said rotor; turning off said motor for decelerating said rotor to zero and sequentially executing step C;

C. performing rotor dynamic balancing operation with respect to said rotor according to the calculated required balance mass and the loaded phase of balance mass and sequentially executing step D;

D. activating said motor, and activating the force free control module, and detecting radial vibration amplitude of said rotor by said displacement detector; and sequentially executing step E, if under the force free control module control, the maximum radial vibration amplitude of said rotor caused by imbalance masses of said rotor does not exceed ½ of said protective clearance during the acceleration of said rotor, indicating that the force free control module is able to inhibit synchronous vibrations of said rotor and the rotor can be accelerated beyond a rigid critical rotational speed of the motor;

E: detecting radial vibration amplitude of said rotor during the acceleration of said rotor to $\omega_E$ during the further acceleration of said motor, and sequentially executing step F, if the radial vibration amplitude of said rotor is lower than the preset vibration threshold regarding the nonrated rotational speed; or turning off said motor from accelerating, and repeating said step B, if the detected radial vibration amplitude of said rotor is over or equivalent to the preset vibration threshold regarding the nonrated rotational speed;

F: activating said motor for further accelerating said rotor to $\omega_E$; turning off said motor from acceleration, and keeping said rotor rotating at $\omega_E$, and then sequentially executing step G;

G. detecting the current radial vibration amplitude of said rotor, a. if the radial vibration amplitude of said rotor is lower than the preset vibration threshold regarding the rated rotational speed, calling said rotor dynamic balancing module via said controller of said magnetic levitation molecular pump according to the current radial vibration amplitude and the phase of said rotor; performing rotor dynamic balancing operation with respect to said rotor by means of influence coefficient method so as to obtain the required balance mass and the loaded phase of the balance mass of said rotor, and turning off said motor for decelerating said rotor to zero:

i. if a residual imbalance mass of said rotor is smaller than the preset imbalance mass, completing the rotor dynamic balancing operation;

ii. otherwise sequentially executing step C;

b. if the radial vibration amplitude of said rotor is above or equivalent to the preset vibration threshold with respect to the rated rotational speed, then repeating step B.

3. The method of rotor dynamic balancing of claim 1, wherein said two balance planes are disposed on an upper portion and a lower portion of said rotor respectively, which are respectively far away from the barycenter of said rotor and close to two ends of said rotor.

4. The method of rotor dynamic balancing of claim 1, wherein a range of said vibration threshold with respect to the nonrated rotational speed is [20 μm, 40 μm]; a range of said vibration threshold with respect to the rated rotational speed is [0.05 μm, 0.1 μm]; and a range of said preset imbalance mass is [5 mg, 12 mg].

5. The method of rotor dynamic balancing of claim 4, wherein, further comprising the step of collecting the radial vibration amplitude of said rotor via said displacement detector through said first radial displacement sensor and said second radial displacement sensor, and collecting the rotational speed of said rotor via said rotational speed detector through a rotational speed detecting sensor.

6. The method of rotor dynamic balancing of claim 1, wherein said vibration threshold with respect to the nonrated rotational speed is 40 μm; said vibration threshold with respect to the rated rotational speed is 0.1 μm; and said preset imbalance mass is 10 mg.

7. The method of rotor dynamic balancing of claim 6, wherein, further comprising the step of collecting the radial vibration amplitude of said rotor via said displacement detector through said first radial displacement sensor and said second radial displacement sensor, and collecting the rotational speed of said rotor via said rotational speed detector through a rotational speed detecting sensor.

8. The method of rotor dynamic balancing of claim 1, wherein, before said step 1, further comprising steps of dynamical simulation calculating for said magnetic levitation molecular pump and obtaining the rigid critical rotational speed of said rotor and the rated rotational speed $\omega_E$.

9. The method of rotor dynamic balancing of claim 8, wherein, further comprising the step of collecting the radial vibration amplitude of said rotor via said displacement detector through said first radial displacement sensor and said second radial displacement sensor, and collecting the rotational speed of said rotor via said rotational speed detector through a rotational speed detecting sensor.

* * * * *